US006608736B1

(12) United States Patent
Klaassen et al.

(10) Patent No.: US 6,608,736 B1
(45) Date of Patent: Aug. 19, 2003

(54) INTEGRATED TRACE SUSPENSION INTERCONNECT FOR HIGH-DATA-RATE SINGLE-ENDED PREAMPLIFIER FOR (G)MR ELEMENTS

(75) Inventors: Klaas Berend Klaassen, San Jose, CA (US); Jacobus Cornelis Leonardus Van Peppen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/566,375

(22) Filed: May 8, 2000

(51) Int. Cl.[7] .......... G11B 5/48
(52) U.S. Cl. .......... 360/246
(58) Field of Search .......... 360/246, 246.3–246.8

(56) References Cited

U.S. PATENT DOCUMENTS

| | | | | |
|---|---|---|---|---|
| 4,823,217 A | * | 4/1989 | Kato et al. | 360/246.8 |
| 4,841,396 A | * | 6/1989 | Kawasaki | 360/246.8 |
| 5,189,578 A | * | 2/1993 | Mori et al. | 360/246.6 |
| 5,218,496 A | * | 6/1993 | Kaczeus | 360/246.8 |
| 5,241,436 A | * | 8/1993 | Kawabata et al. | 360/97.01 |
| 5,270,882 A | | 12/1993 | Jove et al. | |
| 5,278,712 A | * | 1/1994 | Sugaya | 360/246.4 |
| 5,323,278 A | | 6/1994 | Contreras et al. | |
| 5,555,619 A | | 9/1996 | Maggio et al. | |
| 5,717,547 A | * | 2/1998 | Young | 360/246 |
| 5,805,382 A | * | 9/1998 | Lee et al. | 360/246 |
| 6,014,281 A | * | 1/2000 | Contreras | 360/67 |
| 6,195,230 B1 | * | 2/2001 | O'Connor | 360/246.6 |
| 6,256,172 B1 | * | 7/2001 | Griesbach | 360/246 |
| 6,377,411 B1 | * | 4/2002 | Katsumata et al. | 360/323 |

* cited by examiner

*Primary Examiner*—Allen Cao
(74) *Attorney, Agent, or Firm*—Khan O. Tran, Esq.; Banner & Witcoff, Ltd.

(57) ABSTRACT

An interconnect circuit for a readout channel front-end for a disk drive is disclosed that includes a forward line and a return line. Both the forward line and the return line have a first end and a second end. The first end of both the forward line and the return line is connectable to a magnetoresistive head. The second end of both the forward line and the return line is connectable to a single-ended preamplifier. The return line is arranged to be disposed between the forward line and a suspension for a magnetoresistive head. The forward trace has a first predetermined width and the return trace has a second predetermined width that can be the same or different from the first predetermined width. When the interconnect circuit is in a disk drive, the first end of the forward line is connected to a magnetoresistive head, and the second end of the forward line is connected to a single-ended preamplifier. Similarly, the first end of the return line is connected to the magnetoresistive head, and the second end of the return line is connected to the single-ended preamplifier. The return line is disposed between the forward line and a suspension for the magnetoresistive head. The characteristic impedance of the interconnect circuit is selected to be about equal to an input resistance of the single-ended preamplifier. Accordingly, the high-frequency roll-off of a transfer characteristic of the interconnect circuit is primarily determined by a high-frequency skin-effect loss in each of the forward and return lines, and the transfer characteristic of the interconnect circuit does not exhibit a ¼ wavelength effect notch.

18 Claims, 4 Drawing Sheets

12
15
14
16
17
SE preamp
+
−
C
D
$R_{mr}$
+
$V_{mr}$
−
$Z_{0AB}$
SS
length $\ell$

INTEGRATED TRACE SUSPENSION INTERCONNECT FOR HIGH-DATA-RATE SINGLE-ENDED PREAMPLIFIER FOR (G)MR ELEMENTS

BACKGROUND OF THE INVENTION

1. Field of the Invention

The present invention relates to the field of read circuits for magnetic media recordings. More particularly, the present invention relates to an interconnect circuit for a magnetic media disk drive.

2. Description of the Related Art

FIG. 1 shows a high RPM disk drive 10 having a magnetic read/write head (or a recording slider) that is positioned over a selected track on a magnetic disk 11 for recording data using a servo system. The stage servo system includes a voice-coil motor (VCM) 13 for coarse positioning a read/write head suspension 12 and may include a microactuator, or micropositioner, for fine positioning the read/write head over the selected track. FIG. 2 shows an enlarged exploded view of the read/write head end of suspension 12 in the case when a microactuator is also being used. An electrostatic rotary microactuator 14 is attached to a gimbal structure 15 on suspension 12, and a slider 16 is attached to the microactuator. A read/write head 17 is fabricated as part of slider 16.

A single-ended input (SE) preamplifier is preferred over a differential input (Diff.) preamplifier in a readout channel front-end for a disk drive because a single-ended preamplifier requires less chip area and costs less than a Diff. preamplifier for the same performance. For the same performance, the power dissipation of a single-ended preamplifier is lower than that of a Diff. preamplifier. Additionally, a single-ended preamplifier only requires a single power supply, whereas a Diff. preamplifier requires two supplies (a positive supply and a negative supply). For the same chip area, the signal-to-electronics-noise ratio of a single-ended preamplifier is higher. Nevertheless, a drawback associated with a single-ended preamplifier is that a single-ended preamplifier has an upper data rate that is limited by the"¼ wavelength effect" of the"return" transmission line on the head suspension. This limitation is illustrated by FIGS. 3–5.

FIG. 3 shows a schematic block diagram of a conventional readout channel front-end for a disk drive. FIG. 4 shows a cross-sectional view of the conventional integrated trace suspension interconnect circuit shown in FIG. 3 between the (G)MR sensor and the SE preamplifier. In FIG. 3, a magnetoresistive (MR) head is connected to a single-ended preamplifier through a conventional integrated trace suspension interconnect circuit 30. The MR head is represented by a resistance $R_{mr}$ and signal source $V_{mr}$ connected in series. The MR head is connected to the SE preamplifier through traces, or lines, A and B. A stainless steel suspension SS is represented in FIG. 3 along each trace A and B. To achieve high bandwidth, it is necessary for the input impedance of the SE preamplifier to be close to the characteristic impedance of the interconnect circuit $$Z_0 = \sqrt{\frac{L}{C}}\,.$$

Even when the input impedance of the SE preamplifier is close to the characteristic impedance of the interconnect circuit, the bandwidth of the readout channel is always limited by the ¼ wavelength notch of the shorted"return" transmission line, as described below.

FIG. 4 shows a cross-sectional view of the conventional integrated trace suspension interconnect shown in FIG. 3. Traces A and B are each typically formed from copper, and disposed above stainless steel suspension SS adjacent to each other, that is, side-by-side. The widths of traces A and B are typically less than 50 $\mu$m each and are separated from each other by about 50 $\mu$m. Traces A and B are each separated from suspension SS by a dielectric material DM that is about 20 $\mu$m thick. The dielectric constant $\in_r$ of the dielectric material separating traces A and B from suspension SS is typically about 2.7.

The cross-sectional dimensions of traces A and B and the $\in_r$ of the dielectric are always such that the energy travels predominantly between line A and suspension SS and between line B and suspension SS. The energy transfer by the transmission path formed by the A and B lines can be neglected. Consequently, FIG. 3 is an adequate representation of a conventional SE preamplifier readout channel. The "forward" transmission line A/SS is terminated in the SE preamplifier by the characteristic impedance $Z_{OA}$ for obtaining maximum transfer bandwidth. The return transmission line B/SS is grounded at the (grounded) input of the SE preamplifier. For a length l and a propagation velocity $v_p$ at a frequency $f_n=v_p/4l$, the return line B presents an open input to the MR head ($R_{mr}$, $V_{mr}$), thereby creating a null in the frequency transfer characteristic from the head voltage $V_{mr}$ to the SE preamplifier input voltage.

FIG. 5 is a graph showing the voltage transfer characteristic 51 as a function of frequency of the conventional interconnect circuit of FIGS. 3 and 4. A null 52 appears in the frequency transfer characteristic that is given by:

$$f_n=V_p/4l=\tfrac{1}{4}\tau_p=\tfrac{1}{4}l\sqrt{LC},$$

wherein $\tau_p$ is the propagation delay along return line B of length l, L is the distributed series inductance per meter of return line B, and C is the distributed parallel capacitance per meter of return line B. Additionally, $$Z_{0B} = \sqrt{\frac{L}{C}}$$

and most often $Z_{0B}=Z_{0A}$, i.e., the line pairs are designed to be left/right symmetric, such as shown in FIG. 4.

For frequencies below $f_n$, the −3 dB point of the transfer characteristic shorted return line (trace B) constitutes a frequency-dependent inductor at the MR head input side. That is, $$L_{eq} = \frac{Z_{0B}}{2\pi f}\tan\left(\frac{\pi f}{2f_n}\right).$$

This inductance in series with the MR head causes a frequency roll-off of the transfer characteristic, as shown by curve 51 in FIG. 5. The presence of output-shored return line B, which is necessary for accommodating a single-ended amplifier, causes a−3 dB point in the extrinsic transfer (i.e., the signal transfer extrinsic to the electronics) given by:

$$f_{-3dB} = (R_{mr}+Z_{0A})/2\pi L_{eq} = \frac{2f_n}{\pi}\arctan\left(\frac{2R_{mr}}{Z_{0B}}\right).$$

Consider a numerical example in which l=5 cm and $v_p$=0.6 $v_C$. Thus, $f_n$=900 MHz. For $R_{mr}=Z_{0A}$=25 Ω, $f_{-3\ dB}$=630

MHz. This is only the extrinsic bandwidth, that is, the signal transfer characteristic that is extrinsic to the electronics. The.overall bandwidth of the readout channel front-end (i.e., including the SE preamplifier) is narrower still.

The range for the characteristic impedance $Z_0$ for the interconnect circuit is determined by the range over which the width of the traces can be varied and by the range over which the thickness and the $\epsilon_r$ of the dielectric layer between the stainless steel suspension and the traces can be varied. First, the stainless steel suspension SS is not nearly as conductive as copper traces A and B, thereby causing skin-effect losses for the high-frequency signal content of the readout signal. Stainless steel suspension SS must be interrupted at certain places along traces A and B in order to accommodate hinges and gimbals that are part of a leaf-spring head suspension. The interruptions cause reflection points that further deteriorate the high frequency signal transfer characteristic of the interconnect circuit. The suspension/hinge/gimbal arrangement is not always sufficiently wide for accommodating two side-by-side read lines having a preferably low characteristic impedance $Z_0$ (i.e., wide trace widths).

What is needed is a way to eliminate the ¼ wavelength effect associated with a readout channel front-end for a disk drive employing an SE preamplifier, thereby increasing the data rate that can be transferred over an interconnect circuit between an MR head and a single-ended preamplifier.

SUMMARY OF THE INVENTION

The present invention eliminates the ¼ wavelength effect associated with a readout channel front-end for a disk drive employing an SE preamplifier, thereby increasing the data rate that can be transferred over an interconnect circuit between an MR head and a single-ended preamplifier.

The advantages of the present invention are provided by an interconnect circuit for a readout channel front-end for a disk drive. According to the invention, the interconnect circuit includes a forward line and a return line. Both the forward line and the return line have a first end and a second end. The first end of both the forward line and the return line is connectable to a magnetoresistive head. The second end of both the forward line and the return line is connectable to a single-ended preamplifier. The return line is arranged to be disposed between the forward line and a suspension for a magnetoresistive head. A dielectric material, such as polyimide, is disposed between the forward line and the return line. The forward trace has a first predetermined width and the return trace has a second predetermined width that can be the same or different from the first predetermined width.

When the interconnect circuit is in a disk drive, the first end of the forward line is connected to a magnetoresistive head, and the second end of the forward line is connected to a single-ended preamplifier. Similarly, the first end of the return line is connected to the magnetoresistive head, and the second end of the return line is connected to the single-ended preamplifier. The return line is disposed between the forward line and a suspension for the magnetoresistive head. The characteristic impedance of the interconnect circuit is selected to be about equal to an input resistance of the single-ended preamplifier. Accordingly, the high-frequency roll-off of a transfer characteristic of the interconnect circuit is primarily determined by a high-frequency skin-effect loss in each of the forward and return lines and not by the much greater skin effect losses in the stainless steel suspension, and the transfer characteristic of the interconnect circuit does not exhibit a ¼ wavelength effect notch.

BRIEF DESCRIPTION OF THE DRAWINGS

The present invention is illustrated by way of example and not limitation in the accompanying figures in which like reference numerals indicate similar elements, and in which.

DETAILED DESCRIPTION

The present invention eliminates the ¼ wavelength effect associated with a readout channel front-end of a disk drive, thereby increasing the data rate that can be transferred over an interconnect circuit between an MR head and a single-ended preamplifier. Because a single-ended preamplifier can be used, the chip area required for fabricating the SE amplifier is reduced in comparison to that required for a Diff. preamplifier for the same performance characteristics. The power dissipation is less than a Diff. preamplifier having the same performance, and only a single power supply is required. Moreover, for the same chip area, the signal to electronics-noise ratio of a single-ended preamplifier is higher than that of a Diff. preamplifier.

Figure 6:
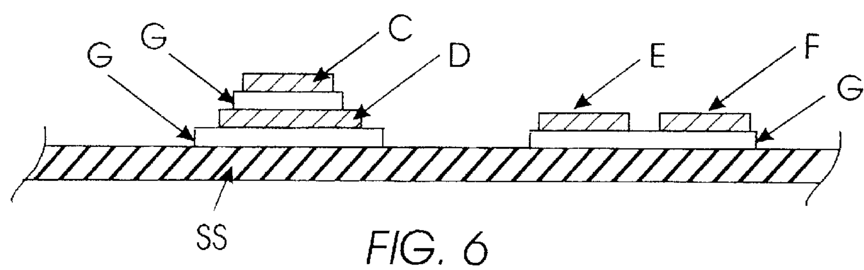
FIG. 6 shows a cross-sectional view of an integrated trace suspension interconnect according to the present invention.
Figure 7:
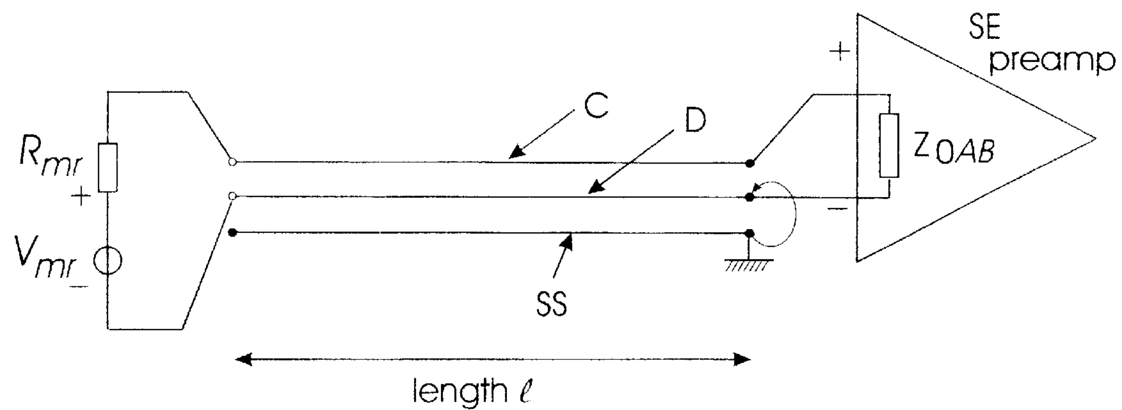
FIG. 7 shows a schematic block diagram of an MR head connected to a single-ended preamplifier through an integrated trace suspension interconnect according to the present invention.

FIG. 6 shows a cross-sectional view of an integrated trace suspension interconnect circuit 60 according to the present invention. FIG. 7 shows a schematic block diagram of an MR head connected to a single-ended preamplifier through an integrated trace suspension interconnect circuit according to the present invention. Interconnect circuit 60 includes read lines C and D that are configured for use with a single-ended preamplifier. In contrast, write lines E and F, which are shown in FIG. 6, are conventionally-configured side-by-side write lines.

Read lines C and D are arranged to be on top of each other with respect to suspension SS, and separated by a dielectric G, such as polyimide. The top-most trace C is used as the "forward" trace, and the bottom-most trace D is used as the "return" trace, as indicated in the schematic block diagram of FIG. 7. According to the invention, traces C and D are not required to have the same width. Traces C and D are designed (i.e., width, $\epsilon_r$ of dielectric and thickness of dielectric) for providing a predetermined characteristic impedance, denoted as $Z_{0AB}$.

Figure 1:
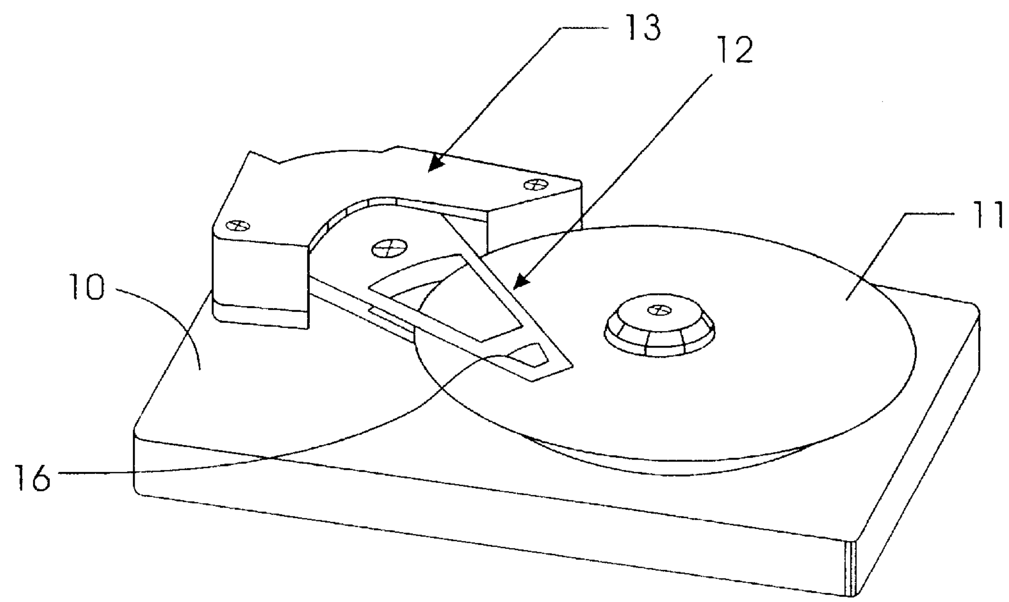
FIG. 1 shows a disk drive having a magnetic read/write head that is positioned over a selected track on a magnetic disk for recording data.
Figure 2:
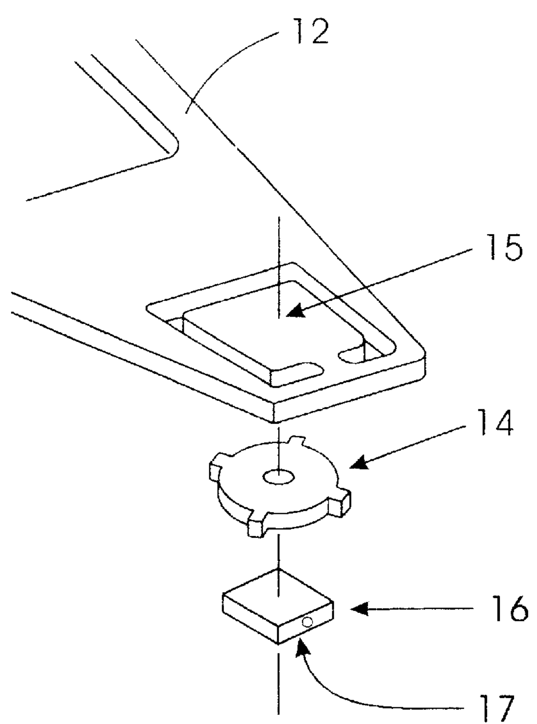
FIG. 2 shows an enlarged exploded view of the read/write head end of a head suspension, which may be used in the disk drive of FIG. 1.
Figure 3:
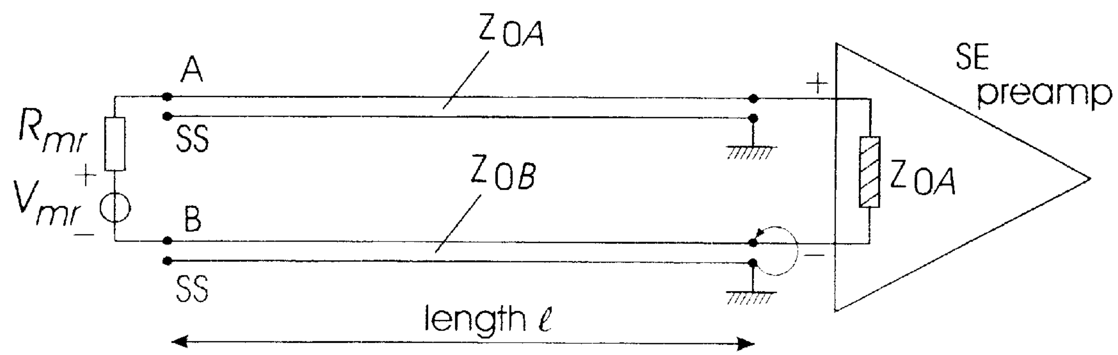
FIG. 3 shows a schematic block diagram of a conventional readout channel front-end for a disk drive.
Figure 4:
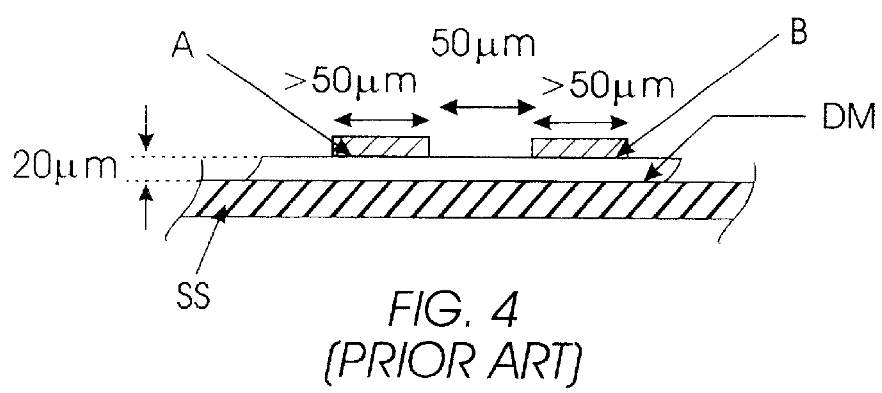
FIG. 4 shows a cross-sectional view of the conventional integrated trace suspension interconnect shown in FIG. 3.

The trace width for traces C and D can be fully as wide as the two traces (A and B) in the conventional configuration shown in FIG. 4, that is, the width of two traces plus the separation space. Consequently, a much wider range of low impedance $Z_{0AB}$ can be accommodated by read lines C and D. This is significant because the noise of a finite input impedance preamplifier having an input resistance equal to $Z_{0AB}$ (for extrinsic bandwidth reasons) is directly proportional to $\sqrt{Z_{0AB}}$. Thus, a lower value of $Z_{0AB}$ provides a lower electronics noise for a matched-impedance design.

An interruption in the stainless steel layer caused by, for example, hinges, gimbals, etc., will not constitute a reflection point in the transmission line formed by traces C and D. Moreover, the signal-propagating transmission line C/D is made from copper conductors, and the high-frequency losses are lower than in the case of one read line conductor being made of stainless steel, as is conventionally done.

Figure 5:
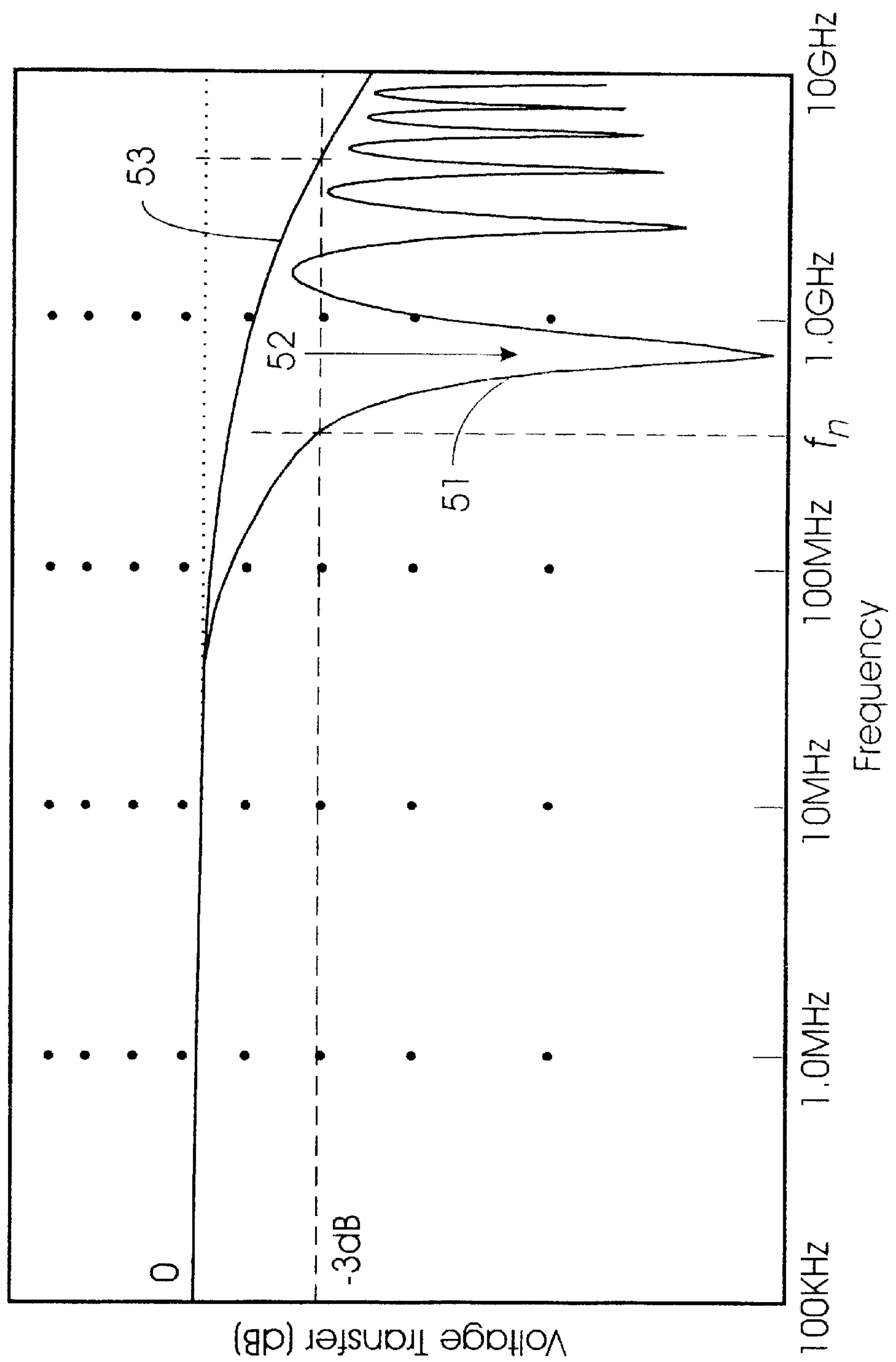
FIG. 5 is a graph showing the voltage transfer as a function of frequency for a conventional interconnect circuit and an interconnect circuit according to the present invention.

According to the present invention, the load termination of the write head side of the transmission line formed by D/SS (between the bottom-most trace D and the stainless steel suspension SS) is not used for signal propagation. Therefore, the characteristic impedance and the losses associated with transmission line D/SS are not important. Even at the frequency for which the transmission line (which is shorted at the output) is ¼λ long, transmission line D/SS does not interfere with the signal propagation along line C/D. The (extrinsic) signal transfer characteristic is as shown by curve 53 in FIG. 5, in contrast to the transfer characteristic of a conventional interconnect circuit (curve 51). The high-frequency roll-off of curve 53 is determined only by the high-frequency skin-effect losses in copper traces C and D.

While the present invention has been described in connection with the illustrated embodiments, it will be appreciated and understood that modifications may be made without departing from the true spirit and scope of the invention.

What is claimed is:

1. An interconnect circuit for a disk drive, comprising:

a forward line having a first end and a second end, the first end being connectable to a magnetoresistive head, and the second end being connectable to a single-ended preamplifier; and a return line having a first end and a second end, the first end being connectable to a magnetoresistive head, and the second end being connectable to a single-ended preamplifier, the return line being arranged to be disposed between the forward line and a suspension for the magnetoresistive head.

2. The interconnect circuit according to claim 1, further comprising a dielectric material disposed between the forward line and the return line.

3. The interconnect circuit according to claim 2, wherein the dielectric material is polyimide.

4. The interconnect circuit according to claim 1, wherein the first end of the forward line is connected to a magnetoresistive head, and the second end of the forward line is connected to a single-ended preamplifier; and wherein the first end of the return line is connected to the magnetoresistive head, and the second end of the return line is connected to the single-ended preamplifier.

5. The interconnect circuit according to claim 4, wherein the return line is disposed between the forward line and a suspension for the magnetoresistive head.

6. The interconnect circuit according to claim 5, wherein a characteristic impedance of the interconnect circuit is about equal to an input resistance of the single-ended preamplifier.

7. The interconnect circuit according to claim 6, wherein a high-frequency roll-off of a transfer characteristic of the interconnect circuit is primarily determined by a high-frequency skin-effect loss in each of the forward and return lines.

8. The interconnect circuit according to claim 6, wherein a transfer characteristic of the interconnect circuit does not have a ¼ wavelength effect notch.

9. The interconnect circuit according to claim 1, wherein the forward trace has a first predetermined width and the return trace has a second predetermined width.

10. The interconnect circuit according to claim 9, wherein the first predetermined width equals the second predetermined width.

11. A disk drive, comprising:

a magnetoresistive head;

a single-ended preamplifier;

a head suspension; and an interconnect circuit, the interconnect circuit including, a forward line having a first end and a second end, the first end being connected to the magnetoresistive head, and the second end being connected to the single-ended preamplifier, and a return line having a first end and a second end, the first end being connected to the magnetoresistive head, and the second end being connected to the single-ended preamplifier, the return line being disposed between the forward line and the head suspension.

12. The disk drive according to claim 11, wherein the interconnect circuit further includes a dielectric material disposed between the forward line and the return line.

13. The disk drive according to claim 12, wherein the dielectric material is polyimide.

14. The disk drive according to claim 11, wherein a characteristic impedance of the interconnect circuit is about equal to an input resistance of the single-ended preamplifier.

15. The disk drive according to claim 14, wherein a high-frequency roll-off of a transfer characteristic of the interconnect circuit is primarily determined by a high-frequency skin-effect loss in each of the forward and return lines.

16. The disk drive according to claim 15, wherein a transfer characteristic of the interconnect circuit does not have a ¼ wavelength effect notch.

17. The disk drive according to claim 11, wherein the forward trace has a first predetermined width and the return trace has a second predetermined width.

18. The disk drive according to claim 17, wherein the first predetermined width equals the second predetermined width.

* * * * *